United States Patent [19]

Dent et al.

[11] Patent Number: 4,619,082

[45] Date of Patent: Oct. 28, 1986

[54] METHOD OF MANUFACTURING A CONTACT LENS

[75] Inventors: Michael J. Dent, Chalfont St Giles; Ian L. Handricks, Chalgrove, both of England

[73] Assignee: Contact Lens Supplies Limited, England

[21] Appl. No.: 663,780

[22] Filed: Oct. 23, 1984

[30] Foreign Application Priority Data

Oct. 24, 1983 [GB] United Kingdom ............... 8328365

[51] Int. Cl.$^4$ .............................................. B24B 1/00
[52] U.S. Cl. .............................. 51/284 R; 51/216 LP
[58] Field of Search ............... 51/284 R, 284 E, 326, 51/216 LP, 217 L, 229, 237 R, 277; 264/1.1, 2.7; 82/1 C, 11

[56] References Cited

U.S. PATENT DOCUMENTS

| 1,911,153 | 5/1933 | Hill | 51/284 |
| 3,030,859 | 4/1962 | Elliot, Jr. | 51/284 |
| 3,064,531 | 11/1962 | Bullock | 51/284 |
| 3,100,955 | 8/1963 | Kratt | 51/237 R |
| 3,662,040 | 5/1972 | Urbach et al. | 51/284 |

Primary Examiner—Frederick R. Schmidt
Assistant Examiner—Robert A. Rose
Attorney, Agent, or Firm—Welsh & Katz, Ltd.

[57] ABSTRACT

A contact lens is manufactured by a method involving machining a first face (2,3) and a reference surface (4) on a blank (1); mounting the blank (1) in a work holder (10) adapted for accurate mounting on a lathe such that the blank (1) is held with its first face (2,3) accurately positioned relative to a datum point on the lathe; and machining a second face (8) on the blank (1). Such method avoids the need for skilled operatives and enables easy manufacture of accurately dimensioned contact lenses.

2 Claims, 5 Drawing Figures

METHOD OF MANUFACTURING A CONTACT LENS

This invention relates to a method of manufacturing a contact lens, and to apparatus for use in carrying out the method.

Contact lenses, worn by a user instead of conventional lenses carried by a frame to correct eyesight deficiencies, are manufactured from plastics materials which in a lens as worn can be hard, soft, or gas permeable.

Such lenses have to be manufactured to a very high degree of accuracy if they are to be useful in providing desired eyesight correction.

A conventional method of manufacturing a contact lens is to machine a blank of suitable material, for example a right circular cylinder some 4 mm long and 12.7 mm in diameter, to produce from one of the major surfaces of the blank, a face shaped for contact with a user's eyeball.

A carrier mounted for rotation on a spindle of a machine tool is heated and a thermoplastic pitch material applied thereto to produce a body of warm pliable material to which the blank is applied with the shaped face of the blank in contact with warm pliable material.

Before the warm pliable material cools and sets the blank must be accurately aligned with its longitudinal axis in line with the axis of rotation of the machine tool spindle and with its free major surface perpendicular to that axis. This is achieved by the operator manufacturing the contact lens engaging the blank in a V-shaped notch in a metal bar while the blank is being rotated on the machine tool spindle, the bar being used to urge the blank into the best aligned position possible such position being that in which movement of the metal bar caused by its engagement with the rotating blank is a minimum. If positioning of the blank is not completed before the initially pliable mounting material has cooled and set, then the carrier with the blank mounted thereon must be removed from the machine tool spindle and reheated to soften the mounting material again, the carrier then being returned to the machine tool spindle for further alignment of the blank. This removal of the carrier for reheating with subsequent replacement for alignment of the blank may have to be carried out many times before satisfactory alignment of the blank is achieved.

After satisfactory alignment the blank is machined on the machine tool to produce a required lens.

This known method has the disadvantages that it can be carried out only by a skilled operator who has received extensive training enabling him to position the blank accurately on the carrier on the machine tool spindle, and that even with a skilled operator alignment of the blank is subject to operator judgement and will not always be the optimum. Further, in view of the method used to secure the blank to the carrier on the machine tool spindle it is not possible to use a datum point on the machine tool itself for determining the thickness of a contact lens produced, since neither the amount of mounting material used to secure the blank to the carrier nor its form on the carrier can be accurately controlled. Thus, each individual contact lens manufactured must have its thickness measured while mounted on the carrier, using a separate thickness gauge.

A further disadvantage of the known method discussed above is that on cooling of the initially warm pliable mounting material on which the blank has been aligned, the blank may be caused to tilt on the carrier such that the previously machined face is no longer correctly positioned relative to the axis of rotation of the machine tool spindle. This will result in the contact lens then produced by further machining of the blank, having inherent prismatic problems due to the incorrect relative alignment of its two machined faces.

According to this invention a method of manufacturing a contact lens, comprises machining a blank to produce thereon a first face shaped for contact with a user's eyeball, and a reference surface accurately spaced a predetermined distance from said first face; mounting the blank on a work holder with a second face of the blank opposite to said first face exposed, the work holder being adapted for accurate mounting on a machine tool and having a part engaged by said reference surface of the blank whereby the work holder holds the blank with said first face accurately positioned relative to a datum point of the machine tool; and machining said second face of the blank held by the work holder on the machine tool to produce a required contact lens.

Preferably the blank is initially in the form of a right circular cylinder and is initially machined to produce said first face from one end surface of the blank and said reference surface as an annular surface facing the same way as said first face and spaced therefrom by a portion of reduced diameter.

Such a machined blank can be mounted on the work holder by receipt of the reduced diameter portion of the blank as a close fit in a hole in the work holder with said reference surface of the blank in engagement with a rim of the hole whereby said first face of the blank is accurately positioned relative to and within the hole in the work holder.

A molten wax or similar material can then be introduced into the hole in the work holder and into contact with said first face of the blank, which material after cooling and setting will serve to secure the blank to the work holder while said second face of the blank is machined, the material being cooled or soaked to release a completed contact lens from the work holder.

Preferably the work holder has a surface accurately located a predetermined distance from the rim of the hole in the work holder, which surface serves as said datum point of the machine tool when the work holder is mounted thereon.

BRIEF DESCRIPTION OF THE DRAWINGS

This invention will now be described by way of example with reference to the drawings, in which:

Referring to FIG. 1, this shows an intermediate blank 1 machined from a standard blank used in the manufacture of contact lenses, such a standard blank being a right circular cylinder of plastics material 4 mm long and 12.7 mm in diameter.

Figure 1:
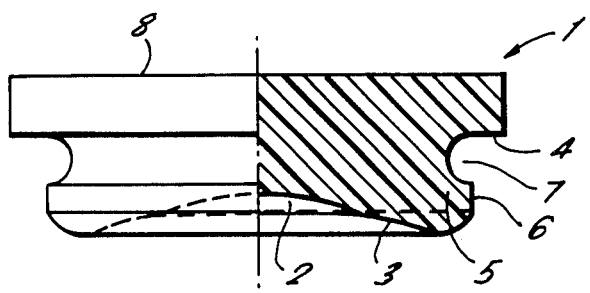
FIG. 1 is a side view in half-section of a partly machined blank obtained during manufacture of a contact lens by the method of this invention.

As shown one end surface of the blank 1 has been machined to produce a first concave compound curve face 2,3 shaped for contact with the eyeball of a person using the contact lens manufactured from the blank 1.

The blank 1 also has an annular reference surface 4 facing the same way as the first face 2,3, and accurately spaced a predetermined distance therefrom by a portion 5 of reduced diameter having a cylindrical outer surface 6. The surface 6 is separated from the reference surface 4 by an arcuate recess 7 the purpose of which will be described later. The other end surface of the blank 1 is left as a circular second face 8.

It is essential that the blank of FIG. 1 be accurately dimensioned, and a blank having the necessary dimensional accuracy can be produced from a standard blank as described above, by the use of a computer controlled diamond tooled cutting machine known as a Polytech 1000 Contact Lens Lathing System available from Contact Lens Supplies Limited of High Wycombe, Buckinghamshire, England.

Figure 2:
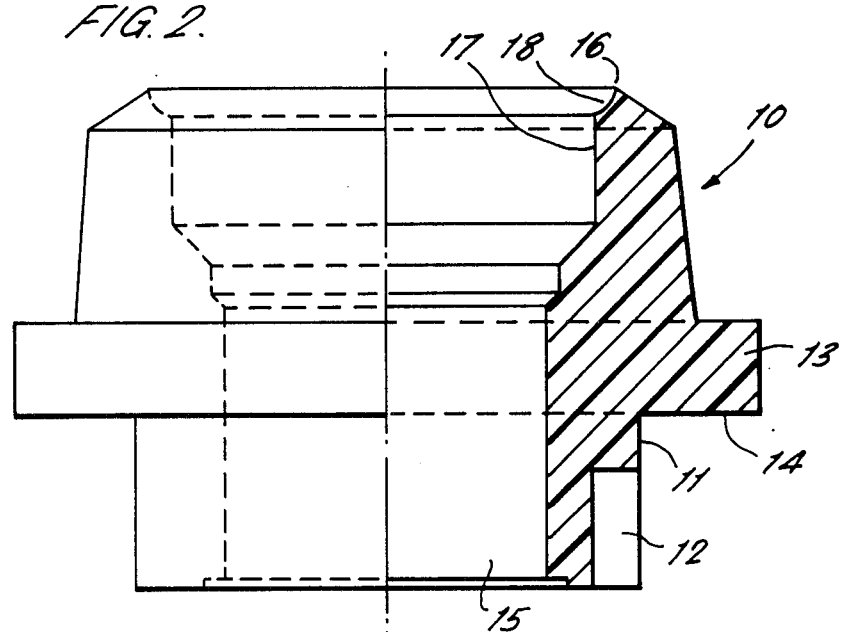
FIG. 2 is a side view in half-section of a work holder used to hold the blank of FIG. 1.

FIG. 2 shows a work holder 10 formed of plastics material adapted to hold a blank 1 as shown in FIG. 1 and to be accurately mounted on a machine tool, for example a lathe as mentioned above.

The work holder 10 has at one end a cylindrical mounting portion 11 which can be gripped in the chuck of a lathe as mentioned above, the mounting portion 11 being formed with a recess 12 in which a part of the chuck engages to prevent rotation of the work holder 10 relative to the chuck during machining of a blank held in the work holder 10. The inner end of the mounting portion 11 is defined by a flange 13 having a surface 14 facing the free end of the mounting portion 11, which surface 14 serves for accurate location of the work holder 10 in the machine tool chuck.

The work holder 10 is formed with a through hole 15 which terminates at the other end of the work holder remote from the mounting portion 11 with a rim 16. Inwardly of the rim 16 the hole 15 has a cylindrical section 17 sized to receive as a close fit the cylindrical surface 6 of the portion 5 of the blank 1 shown in FIG. 1. The surface 18 of the hole 15 between the section 17 and the rim 16 is belled for a purpose which will be described later.

Figure 3:
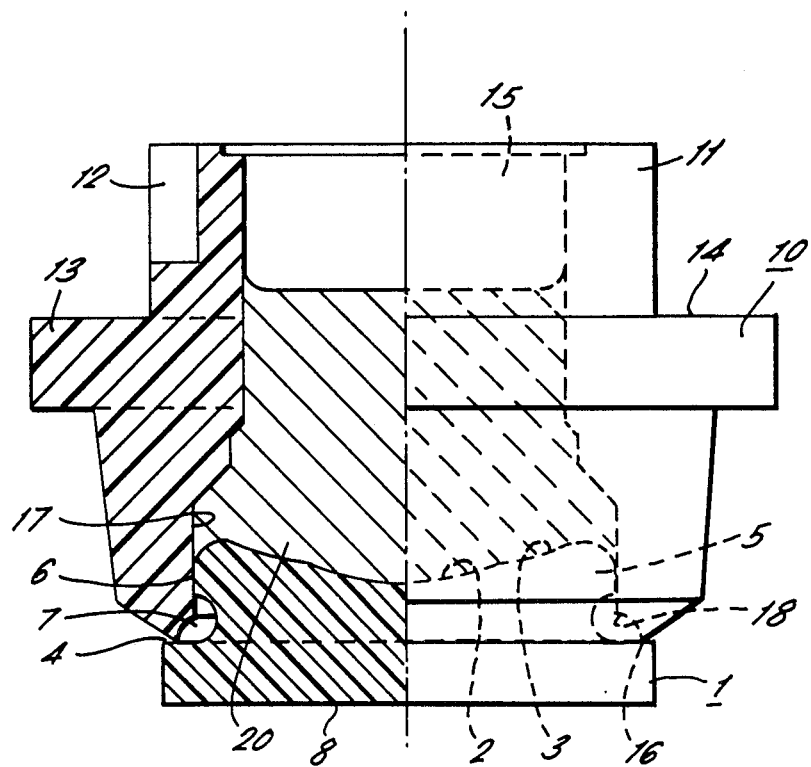
FIG. 3 is a side view in half-section of the work holder of FIG. 2 with the blank of FIG. 1 secured therein.

Referring now to FIG. 3, this shows a blank 1 as shown in FIG. 1 mounted in the work holder 10 of FIG. 2. The portion 5 of the blank 1 is received in the section 17 of the hole 15 in the work holder 10, and the blank 1 is positioned with its reference surface 4 in engagement with the rim 16 on the work holder 10.

When the blank 1 has been mounted in the work holder 10 as shown a molten wax is introduced into the hole 15 in the work holder 10 and into contact with the first face 2,3 of the blank 1. After cooling and setting the wax 20 will serve to secure the blank 1 to the work holder 10 while the second face 8 of the blank 1 is machined.

As clearly shown in FIG. 3, the recess 7 in the blank 1 and the belled surface 18 of the hole 15 in the work holder 10 serve to ensure clearance between the blank and the work holder other than for the engagement between the reference surface 4 of the blank 1 and the rim 16 of the work holder 10, and between the surface 6 of the blank 1 and the surface 17 of the hole 15 in the work holder 10, thus helping to ensure accurate location of the blank in the work holder.

The work holder 10 is manufactured such that the surface 14 of the flange 13 is accurately located a predetermined distance from the rim 16 of the hole 15 in the work holder 10, and thus with the blank 1 mounted in the work holder 10 as shown in FIG. 3, the face 2,3 of the blank 1 is accurately located relative to the surface 14 of the work holder 10. Since the surface 14 of the work holder 10 also serves for accurate location of the work holder 10 on the machine tool, then the surface 14 serves as a datum point of the machine tool relative to the first surface 2,3 of the blank 1.

Thus, with a blank 1 mounted in the work holder 10 as shown in FIG. 3 and with the work holder accurately mounted on a machine tool, the second face 8 of the blank 1 can be machined to produce a required contact lens, the final thickness of the contact lens being determined from the machine tool without the need for using any separate thickness gauge. Further, since the blank 1 is accurately located by the work holder 10 at all times there is no possibility of titling of the blank 1 and thus prismatic problems are avoided.

The completed contact lens is held by wax 20 and is released from the work holder 10 by cooling the work holder 10, for example in a refrigerator, or if a hydrophilic contact lens is being produced by the subsequent hydration operation.

Figure 4:
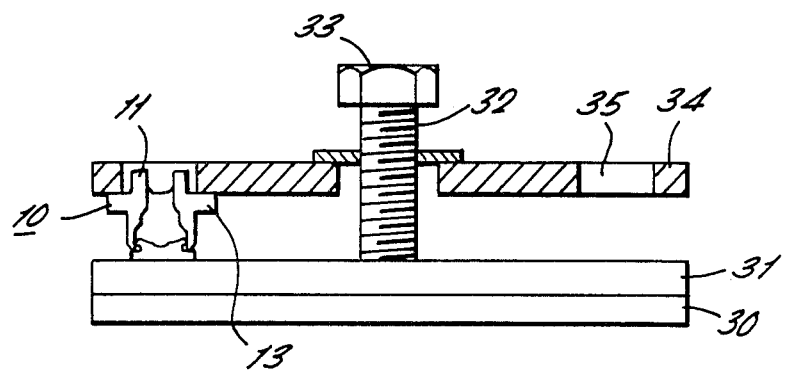
FIGS. 4 and 5 show diagrammatically parts of a jig arrangement for use in producing a plurality of assemblies as shown in FIG. 3.
Figure 5:
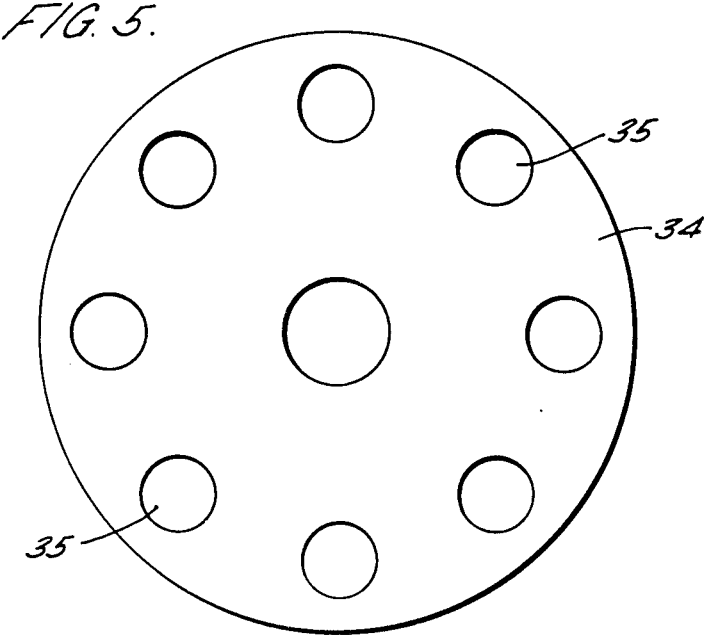

Referring now to FIGS. 4 and 5, these show diagrammatically parts of a jig arrangement which can be used to assist in production of a plurality of blank -work holder assemblies each as shown in FIG. 3, and each ready for mounting on a machine tool for machining of the second faces of the blanks.

The jig arrangement comprises a circular base board 30 having its upper surface covered with a layer 31 of sponge material. Upstanding from the centre of the base board 30 is a bolt 32 carrying a nut 33 which can be screwed down towards the base board 30. Mounted on the bolt 32 beneath the nut 33 is a pressure board 34, shown in plan view in FIG. 5, formed with a plurality of holes 35 each to receive the mounting portion 11 of a work holder as shown in FIG. 2 but not pass the flange 13 of the work holder 10.

A plurality of assemblies each comprising a blank 1 as shown in FIG. 1 mounted in a work holder 10 as shown in FIG. 2 are then mounted between the pressure board 34 and base board 30, as shown in FIG. 4 with the blanks 1 in contact with the sponge layer 31, and the nut 33 is then tightened down to compress the assemblies between the boards 30 and 34 thereby to retain the blanks 1 accurately mounted on their respective work holders 10.

Hot wax 20 (FIG. 3) is then introduced into the hole 15 in each of the work holders 10, and after cooling of the wax to secure the blanks 1 to their work holders 10 the nut 33 is released and the assemblies removed from the jig for mounting on the machine tool.

What is claimed is:

1. A method of manufacturing a contact lens comprising the steps of:

forming a blank in the shape of a right circular cylinder to produce thereon a first lens face facing in a first direction, an annular reference surface on said blank facing said first direction, said blank having an area of reduced diameter intermediate said first lens face and said reference surface, said reference surface being spaced by said reduced diameter area from said first lens face;

mounting said reduced diameter area of said blank within an opening of a work holder, said work holder having an outer annular rim for engaging said reference surface of said blank;

positioning said first lens face of said blank within said opening, the opposite end surface of said blank being exposed;

introducing molten securing material into said work holder and into contact with said first lens face of said blank, said molten material cooling and setting, thereby securing said blank to said work holder;

mounting the work holder on a machine tool such that the work holder holds the blank with said work holder and said first lens face accurately positioned relative to said machine tool;

machining the blank to form thereon a second lens face and concurrently removing all unwanted blank material to leave only the finished contact lens held in the work holder by the securing material; and releasing the finished contact lens from said securing material.

2. A method as claimed in claim 1 in which said work holder has a surface accurately located at a predetermined distance from said rim of said work holder, said surface serving as a datum point of the machine tool when said work holder is mounted thereon.

* * * * *